United States Patent
Hatanaka et al.

(10) Patent No.: US 8,955,627 B2
(45) Date of Patent: Feb. 17, 2015

(54) ELECTRIC VEHICLE

(75) Inventors: Kaoru Hatanaka, Wako (JP); Yoichi Taniguchi, Wako (JP); Atsushi Yonehana, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 171 days.

(21) Appl. No.: 13/347,785

(22) Filed: Jan. 11, 2012

(65) Prior Publication Data

US 2012/0181097 A1    Jul. 19, 2012

(30) Foreign Application Priority Data

Jan. 13, 2011   (JP) .................... 2011-004877

(51) Int. Cl.
| | |
|---|---|
| *B60K 1/00* | (2006.01) |
| *B60R 16/04* | (2006.01) |
| *B62K 11/10* | (2006.01) |
| *B60K 1/04* | (2006.01) |

(52) U.S. Cl.
CPC . *B62K 11/10* (2013.01); *B60K 1/04* (2013.01); *B62K 2202/00* (2013.01); *B60Y 2200/12* (2013.01)
USPC ....... 180/65.51; 180/68.1; 180/68.5; 180/220

(58) Field of Classification Search
CPC .... B60K 11/04; B60K 11/08; B62K 2202/00; B62K 2204/00; B60R 16/04; B62M 7/12
USPC ................ 180/68.1–68.3, 68.5, 65.51, 65.31
See application file for complete search history.

(56) References Cited

U.S. PATENT DOCUMENTS

| | | | | |
|---|---|---|---|---|
| 4,406,342 | A * | 9/1983 | Lacroix | 180/220 |
| 5,524,726 | A * | 6/1996 | Wright, Jr. | 180/220 |
| 5,561,359 | A * | 10/1996 | Matsuura et al. | 180/68.2 |
| 6,047,786 | A * | 4/2000 | Stevenson et al. | 180/65.1 |
| 6,176,338 | B1 * | 1/2001 | Nakagawa et al. | 180/219 |
| 6,276,479 | B1 * | 8/2001 | Suzuki et al. | 180/206.8 |
| 7,210,550 | B2 * | 5/2007 | Yonehana et al. | 180/220 |
| 7,249,644 | B2 * | 7/2007 | Honda et al. | 180/65.51 |
| 7,821,231 | B1 * | 10/2010 | Chang et al. | 320/126 |
| 7,855,011 | B2 * | 12/2010 | Meschter | 429/159 |
| 7,882,911 | B2 * | 2/2011 | Nobuhira | 180/68.1 |
| 7,926,608 | B2 * | 4/2011 | Horii et al. | 180/216 |
| 7,931,110 | B2 * | 4/2011 | Nishiura et al. | 180/220 |
| 7,971,673 | B2 * | 7/2011 | Sasage et al. | 180/220 |

(Continued)

FOREIGN PATENT DOCUMENTS

| | | |
|---|---|---|
| JP | 3493666 B2 | 2/2004 |
| JP | 2008221976 A * | 9/2008 |

*Primary Examiner* — J. Allen Shriver, II
*Assistant Examiner* — Travis Coolman
(74) *Attorney, Agent, or Firm* — Westerman, Hattori, Daniels & Adrian, LLP

(57) ABSTRACT

An electric vehicle has simple structure allowing effective cooling of on-board batteries collectively disposed within a swing arm. The electric vehicle includes a swing arm that houses an electric motor that is swingably mounted to a vehicle body and drives a drive wheel WR, and batteries of a substantially rectangular parallelepiped. A wide case portion that houses the batteries is formed at a position toward a pivot shaft of the swing arm. Also, a protruding portion for forming an air reservoir space above the batteries is formed at a roof portion of the wide case portion. The batteries are disposed side by side in a front-rear direction of the vehicle body. The protruding portion, in a side view of the vehicle body, is substantially convex protruding upward across the batteries.

16 Claims, 8 Drawing Sheets

(56) References Cited

U.S. PATENT DOCUMENTS

| | | | |
|---|---|---|---|
| 8,002,067 B2* | 8/2011 | Nishiura et al. | 180/220 |
| 8,240,414 B2* | 8/2012 | Sasahara et al. | 180/65.31 |
| 8,342,278 B2* | 1/2013 | Oohashi | 180/68.5 |
| 8,360,188 B2* | 1/2013 | Yonehana et al. | 180/220 |
| 8,360,189 B2* | 1/2013 | Matsuoka et al. | 180/220 |
| 8,376,075 B2* | 2/2013 | Sasage et al. | 180/68.5 |
| 2004/0079574 A1* | 4/2004 | Ono et al. | 180/252 |
| 2005/0224266 A1* | 10/2005 | Konno et al. | 180/68.1 |
| 2006/0070784 A1* | 4/2006 | Tahara | 180/205 |
| 2007/0166583 A1* | 7/2007 | Muramatsu | 429/22 |
| 2008/0238355 A1* | 10/2008 | Muramatsu | 320/101 |
| 2010/0167098 A1* | 7/2010 | Furukawa et al. | 429/24 |
| 2011/0018378 A1* | 1/2011 | Stover | 310/74 |
| 2011/0024206 A1* | 2/2011 | Sagara et al. | 180/65.1 |
| 2011/0162905 A1* | 7/2011 | Pearlman et al. | 180/447 |
| 2012/0000720 A1* | 1/2012 | Honda et al. | 180/65.1 |
| 2012/0176086 A1* | 7/2012 | Nakamura et al. | 320/109 |
| 2012/0326665 A1* | 12/2012 | Yin et al. | 320/109 |
| 2013/0233633 A1* | 9/2013 | Matsuda | 180/220 |
| 2013/0264134 A1* | 10/2013 | Matsuda | 180/68.1 |
| 2013/0270022 A1* | 10/2013 | Matsuda | 180/220 |
| 2013/0270024 A1* | 10/2013 | Matsuda | 180/220 |
| 2013/0277133 A1* | 10/2013 | Matsuda | 180/220 |
| 2013/0292198 A1* | 11/2013 | Matsuda | 180/220 |

* cited by examiner

ELECTRIC VEHICLE

CROSS REFERENCE TO RELATED APPLICATIONS

The present application claims priority under 35 U.S. C §119 to Japanese Patent Application No. 2011-004877 filed Jan. 13, 2011 entitled "Electric Vehicle." The contents of this application are incorporated by reference in their entirety.

TECHNICAL FIELD

The application relates to an electric vehicle, and more particularly, to an electric vehicle in which the electric power is supplied to an electric motor from on-board batteries to rotate a drive wheel by the driving force of the electric power, thereby traveling.

BACKGROUND OF THE INVENTION

In the past, there has been known an electric vehicle in which the electric power is supplied to an electric motor from on-board batteries to rotate a drive wheel by the driving force of the electric power, thereby traveling.

JP-B No. 3493666 discloses a saddle-ride type two-wheeled electric vehicle of scooter type having a structure in which an electric motor is housed within a swing arm swingably mounted to a vehicle body, and plural on-board batteries for supplying electric power to the electric motor are disposed at dispersed locations, such as below a footrest floor and at the rear of a luggage box on the vehicle body.

SUMMARY OF THE INVENTION

However, in the technology disclosed in JP-B No. 3493666, since the on-board batteries are disposed at the dispersed locations of the vehicle body, there have been problems of increases in length of respective wires connected to the on-board batteries, the need for a complicated routing of the wires, and the need for plural stays for fixing the on-board batteries to the vehicle body. On the other hand, if the on-board batteries are collectively disposed within the swing arm in order to address these problems, the on-board batteries generating heat during traveling are disposed close to one another, leading to difficulty in cooling. For this reason, there has been a problem in that the need for providing an electric fan or the like for facilitating cooling in the swing arm arises.

Accordingly, an electric vehicle is provided with a simple structure allowing effective cooling of on-board batteries that are collectively disposed within a swing arm.

A first feature is that an electric vehicle includes a swing arm that is swingably mounted to a vehicle body of the electric vehicle, and that houses an electric motor for driving a drive wheel of the electric vehicle and batteries of a substantially rectangular parallelepiped shape. In the electric vehicle, a wide case portion that houses the batteries is formed at a position toward a pivot shaft of the swing arm, and a protruding portion for forming an air reservoir space above the batteries is formed at a roof portion of the wide case portion.

Also, a second feature is that the two batteries are disposed in a line in a front-rear direction of the vehicle body, and the protruding portion, in a side view of the vehicle body, is a substantially convex shape protruding upward from the batteries.

Also, a third feature is that a surface of the protruding portion is provided with heat releasing fins.

Also, a fourth feature is that the two batteries are disposed in a line in a front-rear direction of the vehicle body, and, in a side view of the vehicle body, the battery located on a vehicle-body rear side is offset upwardly of the vehicle body with respect to the battery located on a vehicle-body front side. Also, the air reservoir space is provided above the battery located on the vehicle-body front side by forming the protruding portion at the roof portion of the wide case portion.

Also, a fifth feature is that the two batteries are disposed in a line in a front-rear direction of the vehicle body, and, in a side view of the vehicle body, are disposed parallel to each other, inclined rearwardly of the vehicle body. Also, the air reservoir space is provided above the batteries by forming the protruding portion at the roof portion of the wide case portion.

Also, a sixth feature is that the batteries are inclined such that vertical positions of the two batteries disposed in a line in the front-rear direction of the vehicle body are equal.

Also, a seventh feature is that the electric vehicle further includes a cooling duct for causing traveling wind introduced from a front of the vehicle body to blow onto the protruding portion.

Furthermore, an eighth feature is that, within the swing arm, there are housed at least the electric motor, the batteries, and a substrate having a drive circuit of the electric motor and a charging circuit for the batteries.

According to the first feature, the wide case portion that houses the batteries is formed at a position toward the pivot shaft of the swing arm, and the protruding portion for forming the air reservoir space above the batteries is formed at a roof portion of the wide case portion. Thus, it becomes easy to cause heat generated by the batteries to escape into the air reservoir space formed above the batteries and cause the traveling wind to blow onto the protruding portion protruding upwardly of the vehicle body, thereby facilitating release of heat from the wide case portion housing the batteries. Consequently, the cooling effect of the batteries can be increased only by varying the shape of the swing arm. Even in a case where the plural batteries are collectively disposed, an electric fan or the like for cooling becomes unnecessary, so that an increase in complexity of the swing arm structure can be avoided.

Also, the batteries can be collectively disposed, thereby allowing simplification of wires, etc. connected to the batteries. For example, in a case where two batteries of the same type are connected in series, a bus bar serving as a wire for connecting both batteries in series can be also shortened.

According to the second feature, the two batteries are disposed in a line in the front-rear direction of the vehicle body, and the protruding portion, in a side view of the vehicle body, is a substantially convex shape protruding upward from the batteries. Thus, the air heated between the front and rear batteries easily accumulates on the upper side of the vehicle body, resulting in a further increase in the cooling effect created by the protruding portion.

According to the third feature, a surface of the protruding portion is provided with heat releasing fins. Thus, with simple structure, the effect of heat release from the surface of the protruding portion is further increased.

According to the fourth feature, the two batteries are disposed in a line in a front-rear direction of the vehicle body, and the battery located on a vehicle-body rear side, in a side view of the vehicle body, is offset upwardly of the vehicle body with respect to the battery located on a vehicle-body front side. Also, the air reservoir space is provided above the battery located on the vehicle-body front side by forming the protruding portion at the roof portion of the wide case portion. Thus, even in a case where, within the swing arm, the batteries are disposed adjacent to each other in the front-rear direction of the vehicle body and offset in a vertical direction of the vehicle body, the air reservoir space formed above the battery located on the vehicle-body front side allows an increase in the cooling effect. Also, in a case where positive and negative terminals provided on side surface of each of the batteries are vertically spaced apart in a side view of the vehicle body, the bus bar serving as a wire for connecting both batteries in series can be shortened, thereby allowing the structure simplification.

According to the fifth feature, the two batteries are disposed in a line in the front-rear direction of the vehicle body, and, in a side view of the vehicle body, are disposed parallel to each other, inclined rearwardly of the vehicle body. Also, the air reservoir space is provided above the batteries by forming the protruding portion at the roof portion of the wide case portion. Thus, even in a case where the two batteries are disposed in an inclined manner, the air reservoir space provided above the two batteries allows an increase in the cooling effect. Also, in a case where the positive and negative terminals provided on the side surface of each of the batteries are vertically spaced apart in a side view of the vehicle body, the bus bar serving as a wire for connecting both batteries in series can be shortened, thereby also allowing the structure simplification.

According to the sixth feature, the batteries are inclined such that vertical positions of the two batteries disposed in a line in the front-rear direction of the vehicle body are equal, thereby allowing a reduction in size of the wide case portion in the vertical direction of the vehicle body and the lowering of a protrusion at the top of the swing arm. Thus, the swinging range of the swing arm can be expanded.

According to the seventh feature, the electric vehicle further includes the cooling duct for causing traveling wind introduced from a front of the vehicle body to blow onto the protruding portion. Thus, it is possible to positively cause the traveling wind to blow onto the protruding portion, thereby allowing a further increase in cooling performance of the wide case portion.

According to the eighth feature, within the swing arm, there are housed at least the electric motor, the batteries, and a substrate having a drive circuit of the electric motor and a charging circuit for the batteries. Therefore, the components accompanied by extreme heat generation in the electric vehicle are housed within the swing arm, so that all these heating elements can be cooled by the cooling structures provided on the swing arm. Consequently, since it becomes unnecessary to provide cooling structures on the vehicle body, the vehicle body structure can be simplified.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
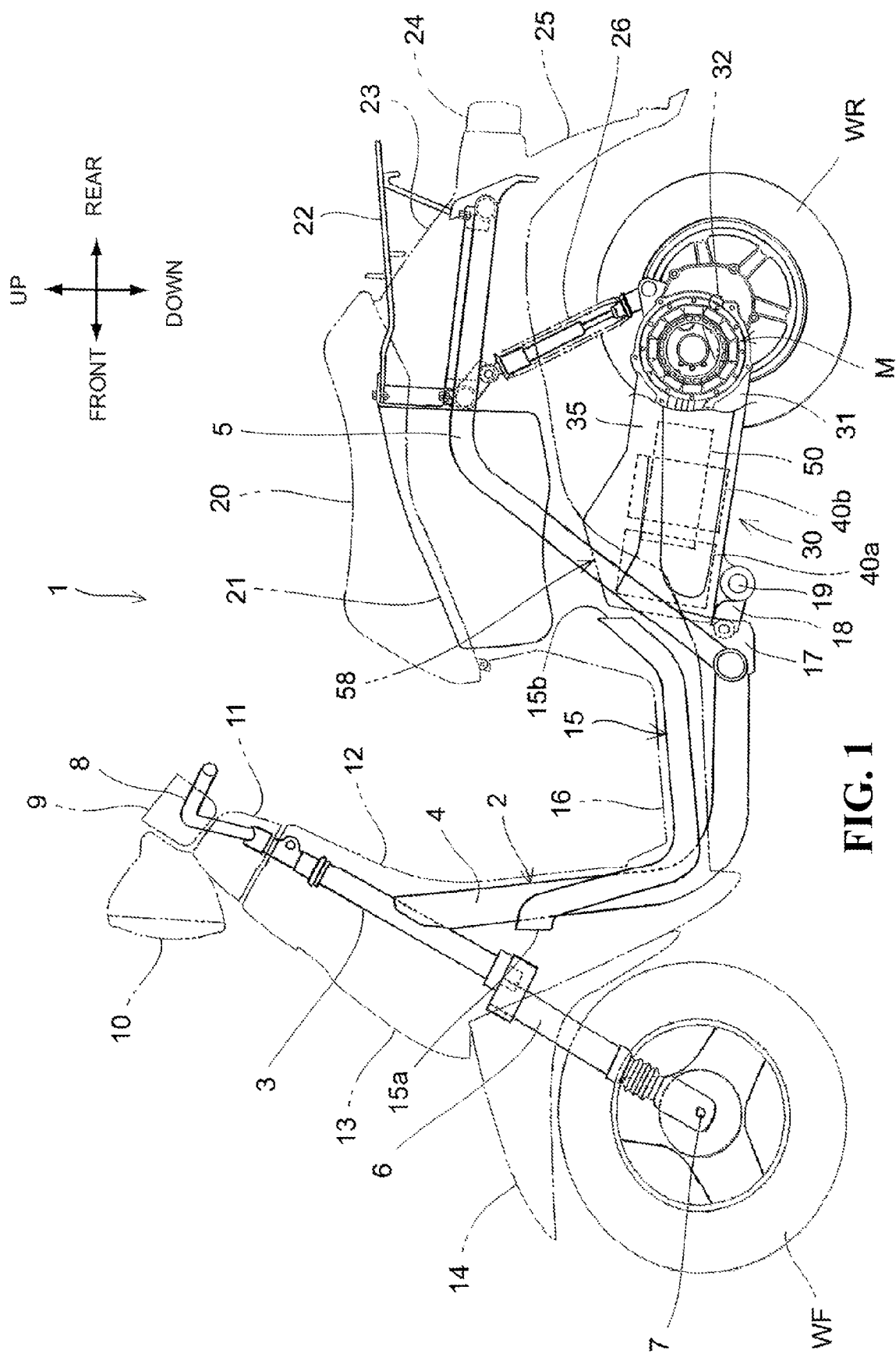
FIG. 1 is a side view of an electric vehicle according to one embodiment of the present invention.

Hereinafter, preferred embodiments of the present invention will be described in detail with reference to the accompanying drawings. FIG. 1 is a side view of an electric vehicle 1 according to one embodiment. The electric vehicle 1 is a saddle-ride type two-wheeled vehicle of scooter type having a low floor 16, in which a rear wheel WR is driven by an electric motor M housed in a swing arm (unit swing) 30. A head pipe 3 for rotatably journaling a stem shaft (not shown) is connected to a front portion of a body frame 2. A steering handlebar 8 covered with a handlebar cover 11 is connected to an upper portion of the stem shaft. On the other hand, a pair of left and right front forks 6 for turnably journaling a front wheel WF through an axle 7 is connected to a lower portion of the stem shaft.

The body frame 2 includes a main pipe 4 extending downward from a rear portion of the head pipe 3, and a rear frame 5 coupled to a rear end of the main pipe 4 and extending upward toward the rear of a vehicle body. A floor frame for supporting the low floor 16 is mounted to a portion of the main pipe 4 which is under the low floor 16 and oriented in a front-rear direction of the vehicle body. A pair of left and right pivot plates 17 is mounted to the connection portion between the main pipe 4 and the rear frame 5.

The swing arm 30 is of cantilever type having an arm portion only on the left side in a vehicle width direction, and is swingably journaled to the body frame 2 through a pivot shaft 19 passing through a link 18 mounted to the pivot plates 17. The swing arm 30 is a partially hollow structure made of metal such as aluminum, in which a swing arm cover 35 is mounted to the left in the vehicle width direction of a body case 31. The electric motor M is housed within the swing arm 30 in the vicinity of an axle 32. A substrate 50 serving as a controller of the electric motor M is disposed forwardly of the vehicle body with respect to the electric motor M. Batteries 40*a* and 40*b* for supplying electric power to the electric motor M are disposed close to each other in the front-rear direction of the vehicle body, and are disposed in the swing arm 30 toward the front of the vehicle body and on the right side in the vehicle width direction of the substrate 50. In the substrate 50, there are included a drive circuit of the electric motor M, a charging circuit for charging the batteries 40*a* and 40*b* with power from an external power source, a chip for storing a data map defining the relationship between the throttle opening and the output of the motor and the like.

A protruding portion 58 is formed on the body case 31 of the swing arm 30 toward the front of the vehicle body. The protruding portion 58, which is in the form of a convex shape having a protrusion at the top thereof, is located above the batteries 40*a* and 40*b*. An exhaust port 15*b* of a cooling duct 15 is disposed, close to the protruding portion 58, forwardly of the vehicle body with respect to the protruding portion 58. The cooling duct 15, made of a pipe material, has the function of positively cooling a surface of the protruding portion 58 by taking in traveling wind through an intake port 15*a* provided on a vehicle-body front side thereof and guiding the traveling wind to a vehicle-body rear side thereof to discharge it through the exhaust port 15*b*.

The rear wheel WR is rotatably journaled to the swing arm 30 through the axle 32. A rear end of the swing arm 30 is suspended through a rear cushion 26 by the rear frame 5. A storage box 21 serving as a luggage space is disposed under a seat 20 in such a manner as to be sandwiched between the pair of left and right rear frames 5.

The main pipe 4 of the body frame 2 is covered with a front cowl 13 from the vehicle-body front side and a leg shield 12 from the vehicle-body rear side. A meter 9 is disposed above the handlebar cover 11. Also, a headlight 10 is mounted forwardly of the vehicle with respect to the meter 9. A front fender 14 that covers the front wheel WF is fixed to an upper portion of the front forks 6.

The rear frames 5 are covered with a seat cowl 23 from the lateral side in the vehicle width direction. A taillight unit 24 is mounted to a rear end of the seat cowl 23. A rear carrier 22 connected to the rear frames 5 protrudes above the taillight unit 24. A rear fender 25 that covers the rear wheel WR from behind and above is provided below the taillight unit 24.

Figure 2:
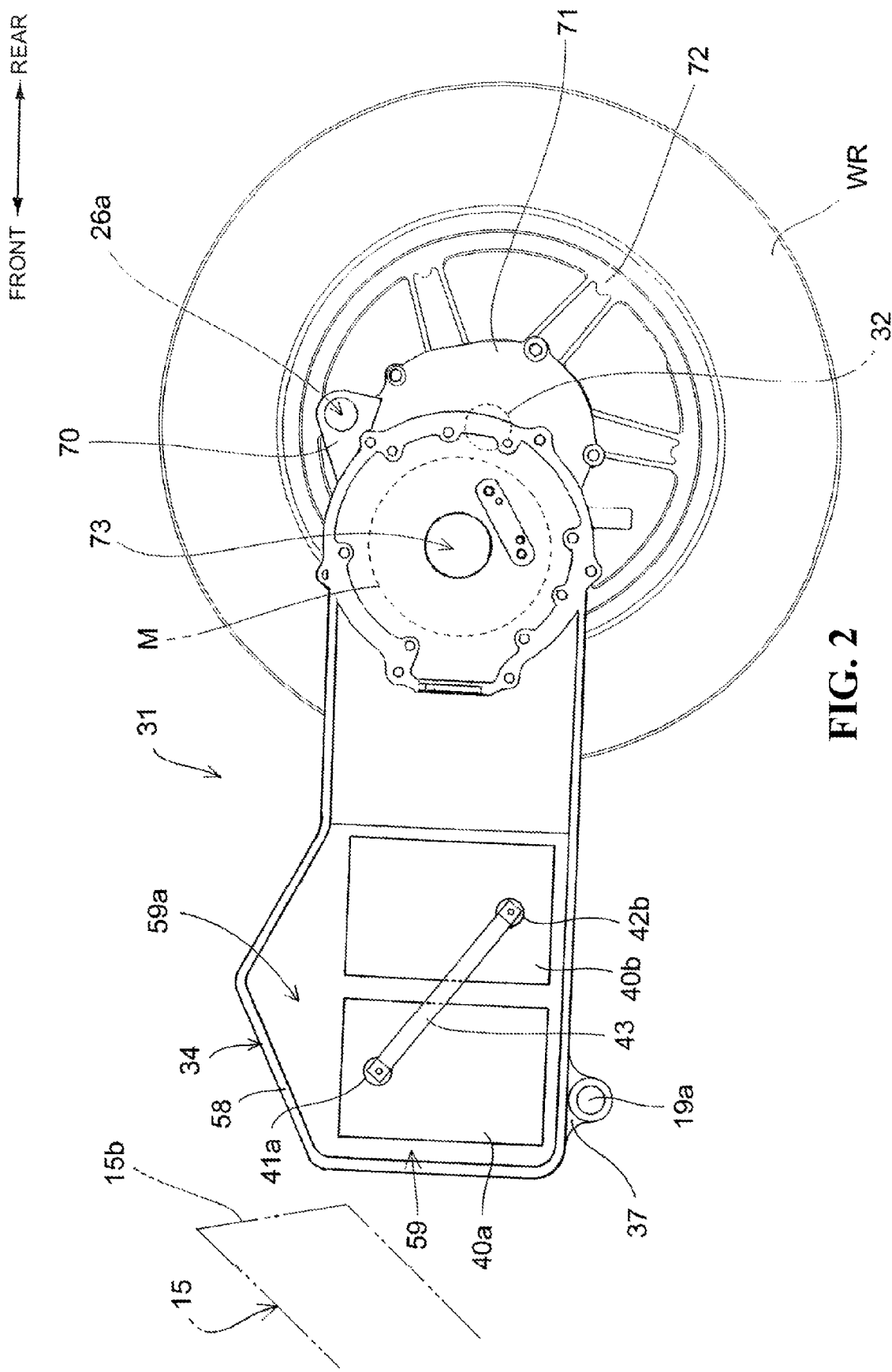
FIG. 2 is an enlarged side view of a body case of a swing arm.
Figure 3:
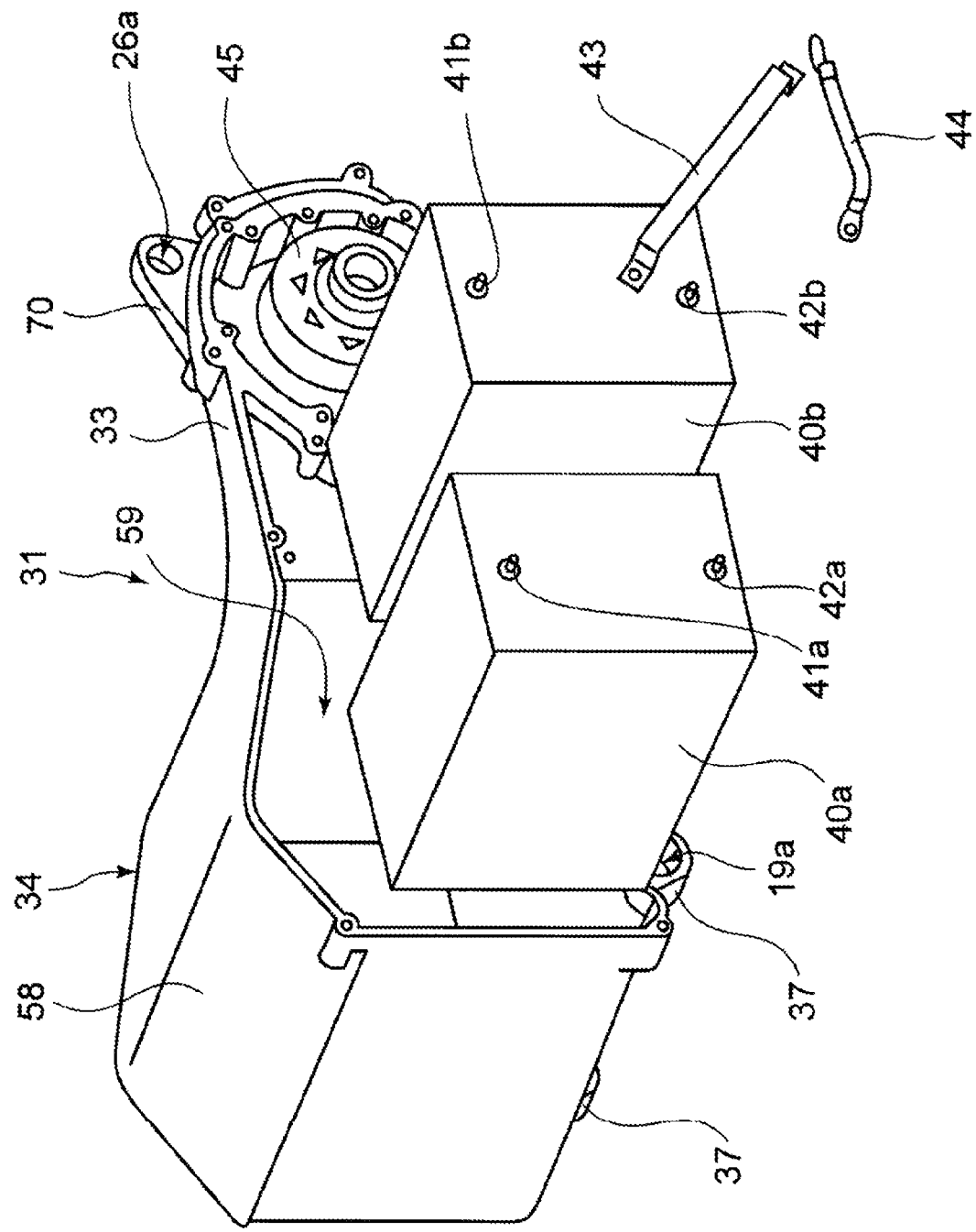
FIG. 3 is an exploded perspective view (with batteries mounted) of the body case.

FIG. 2 is an enlarged side view of the body case 31 of the swing arm 30. Also, FIG. 3 is an exploded perspective view of the body case 31. FIGS. 2 and 3 illustrate a state without the swing arm cover 35 that is mounted to the left in the vehicle width direction of the body case 31. The body case 31, on the vehicle-body front side thereof, is formed with a wide case portion 34 extended in the vehicle width direction to house the batteries 40a and 40b of a substantially rectangular parallelepiped. A wall surface forming the wide case portion 34 is formed of a thin sheet material, including a roof portion thereof. The batteries 40a and 40b disposed side by side in the front-rear direction of the vehicle body are inserted from the left in the vehicle width direction into a storage space 59 opening toward the left in the vehicle width direction to be stored therein.

The wide case portion 34 is provided, at a lower portion on the vehicle-body front side thereof, with a pair of left and right pivot flanges 37 in which a through hole 19a of the pivot shaft 19 (see FIG. 1) is formed. Thus, the batteries 40a and 40b, which are heavy objects, are disposed closed to the pivot shaft 19 of the swing arm 30. This causes a reduction in the moment of inertia during swinging of the swing arm 30 and allows smooth swinging movement.

A reduction gear case 71 that houses a reduction gear mechanism for reducing the rotational speed of the electric motor M is mounted to a rear end of an arm portion 33 provided only on the left side in the vehicle width direction. The axle 32, serving as a final output shaft of the reduction gear mechanism, protrudes to the right in the vehicle width direction from the reduction gear case 71. A wheel 72 of the rear wheel WR is fixed to an end of the axle 32. On the other hand, a rotor 45 of the electric motor M is mounted on the left side in the vehicle width direction of the reduction gear case 71. Also, a mounting flange 70 having a through hole 26a for mounting the rear cushion 26 (see FIG. 1) is provided on an upper portion of the reduction gear case 71.

The batteries 40a and 40b of the same construction using lithium ion have a modular structure composed of plural cells. In this embodiment, five cells arranged in the vehicle width direction form one module. The batteries 40a and 40b are provided, on their respective left side surfaces in the vehicle width direction, with positive and negative terminals 41a and 42a, and positive and negative terminals 41b and 42b, respectively. A bus bar 43, serving as an electrical conductor, connects between the positive terminal 41a of the battery 40a and the negative terminal 42b of the battery 40b, thereby connecting both batteries 40a and 40b in series. One end of a negative-side wire 44 is connected to the negative terminal 42a of the battery 40a.

The protruding portion 58 of the wide case portion 34 is formed by causing the thin sheet material forming the roof portion of the storage space 59 to protrude upward. Thus, an air reservoir space 59a having the shape of a convex protruding upward in a side view of the vehicle body is formed above the stored batteries 40a and 40b.

The batteries 40a and 40b are disposed within the storage space 59 formed in the body case 31, close to each other in the front-rear direction of the vehicle body. Therefore, heat generated during traveling is likely to fill, particularly in between both batteries 40a and 40b. In this embodiment, however, this heat can escape into the air reservoir space 59a formed above both batteries 40a and 40b. Also, the heat in the air reservoir space 59a is released to the outside of the vehicle body from a surface of the protruding portion 58, resulting in an increase in the cooling effect of the batteries 40a and 40b. Furthermore, in this embodiment, there is provided the cooling duct 15 (see FIG. 1) for positively causing the traveling wind introduced from the vehicle-body front side to blow onto the protruding portion 58, thereby facilitating release of heat from the surface of the protruding portion 58. It should be noted that, in order to minimize the dimension in the vehicle width direction of the body case 31, the batteries 40a and 40b are disposed without being offset in the vehicle width direction with respect to each other.

Figure 4:
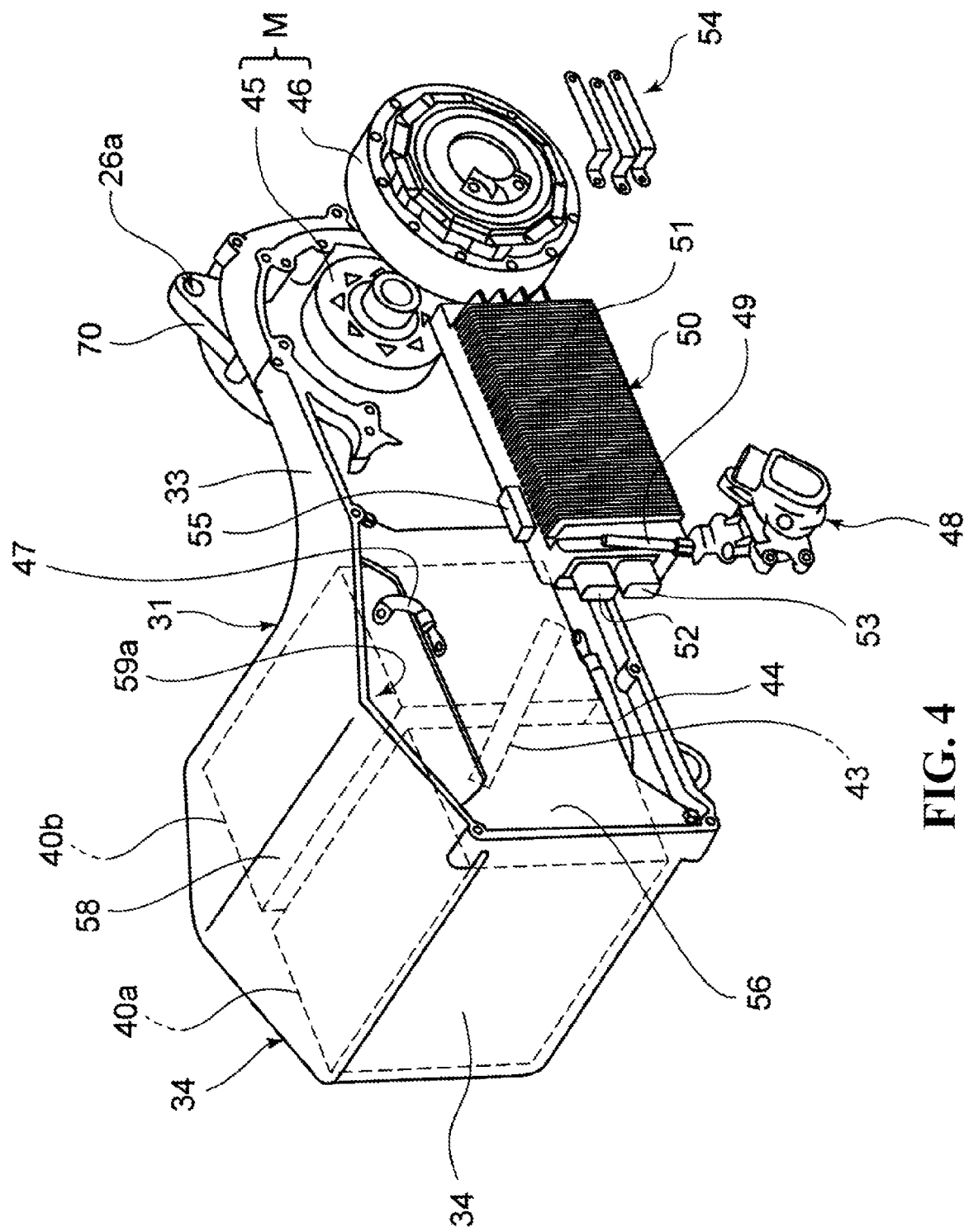
FIG. 4 is an exploded perspective view (with a substrate and an electric motor mounted) of the body case.

FIG. 4 is an exploded perspective view, with the substrate 50 and a stator 46 mounted, of the body case 31. When the batteries 40a and 40b are stored in a predetermined position, a partition plate 56 is mounted to the body case 31, with plural bolts or the like, close to left side surfaces in the vehicle width direction of both batteries 40a and 40b. The partition plate 56 is made of an insulating material such as resin. The partition plate 56 is constructed in such a manner that only the other end of the negative-side wire 44 connected to the negative terminal 42a (see FIG. 3) of the battery 40a and the other end of a positive-side wire 47 connected to the positive terminal 41b (see FIG. 3) of the battery 40b are protruded to the left in the vehicle width direction through gaps formed in upper and lower portions of the partition plate 56.

The stator 46 of the electric motor M is fixed to the body case 31 in such a manner as to cover the rotor 45 from the left side in the vehicle width direction. The substrate 50 is disposed forwardly of the vehicle body with respect to the stator 46. The substrate 50, on the left side in the vehicle width direction, is provided with plural cooling fins 51. The substrate 50 is provided, at an end on the vehicle-body front side thereof, with connectors 52 and 53 for connecting harnesses (not shown) routed on the vehicle body. In the harnesses serving as electrical wiring, there can be included wires for vehicle speed sensor signals which detect the rotational speed of the front wheel WF, wires for ignition switch operating signals, and the like, in addition to wires for charging the batteries 40a and 40b with power from an external power source (for example, a 100-volt commercial power source).

A throttle position sensor 48 driven by a throttle cable 49 is disposed forwardly of the vehicle body with respect to the substrate 50. The throttle position sensor 48 is fixed to the partition plate 56 with bolts or the like. An end of the throttle cable 49 is routed toward the front of the vehicle body along the body frame 2 to be connected to a throttle grip that is mounted to the steering handlebar 8 (see FIG. 1) to allow an occupant to perform a turning operation.

The substrate 50, on the vehicle-body front side, is fixed to the partition plate 56. Also, the substrate 50, on the vehicle-body rear side, is fixed to the body case 31 with bolts or the like. The substrate 50, on the vehicle-body rear side, extends to a position overlapping the arm portion 33 in a side view of the vehicle body. Therefore, the substrate 50 is fixed with bolts for utilization as a rigid member of the body case 31, thereby allowing an increase in rigidity of the arm portion 33.

When mounting of the stator 46, the substrate 50, and the throttle position sensor 48 is finished, a three-phase bus bar 54 for supplying electric power to the stator 46 from the substrate 50 is mounted. The required total length of the three-phase bus bar 54 is small because the substrate 50 and the stator 46 are disposed close to each other. This allows reductions in losses and noises during transmission of electric power. The swing arm cover 35 (see FIG. 1) is mounted to the body case 31 to seal the body case 31 so as to prevent the entry of water, dust or the like into the swing arm 30.

In this embodiment, all heating elements, composed of the electric motor M, the batteries 40a and 40b, and the substrate 50, are disposed within the swing arm 30. For this reason, the temperature in the internal space of the swing arm 30 is likely to increase due to the heat generated by these elements. However, since the protruding portion 58 provided on the wide case portion 34 results in an increase in the cooling effect, other cooling structures become unnecessary, and increases in complexity of the vehicle body structure and the number of components can be also prevented.

Figure 5:
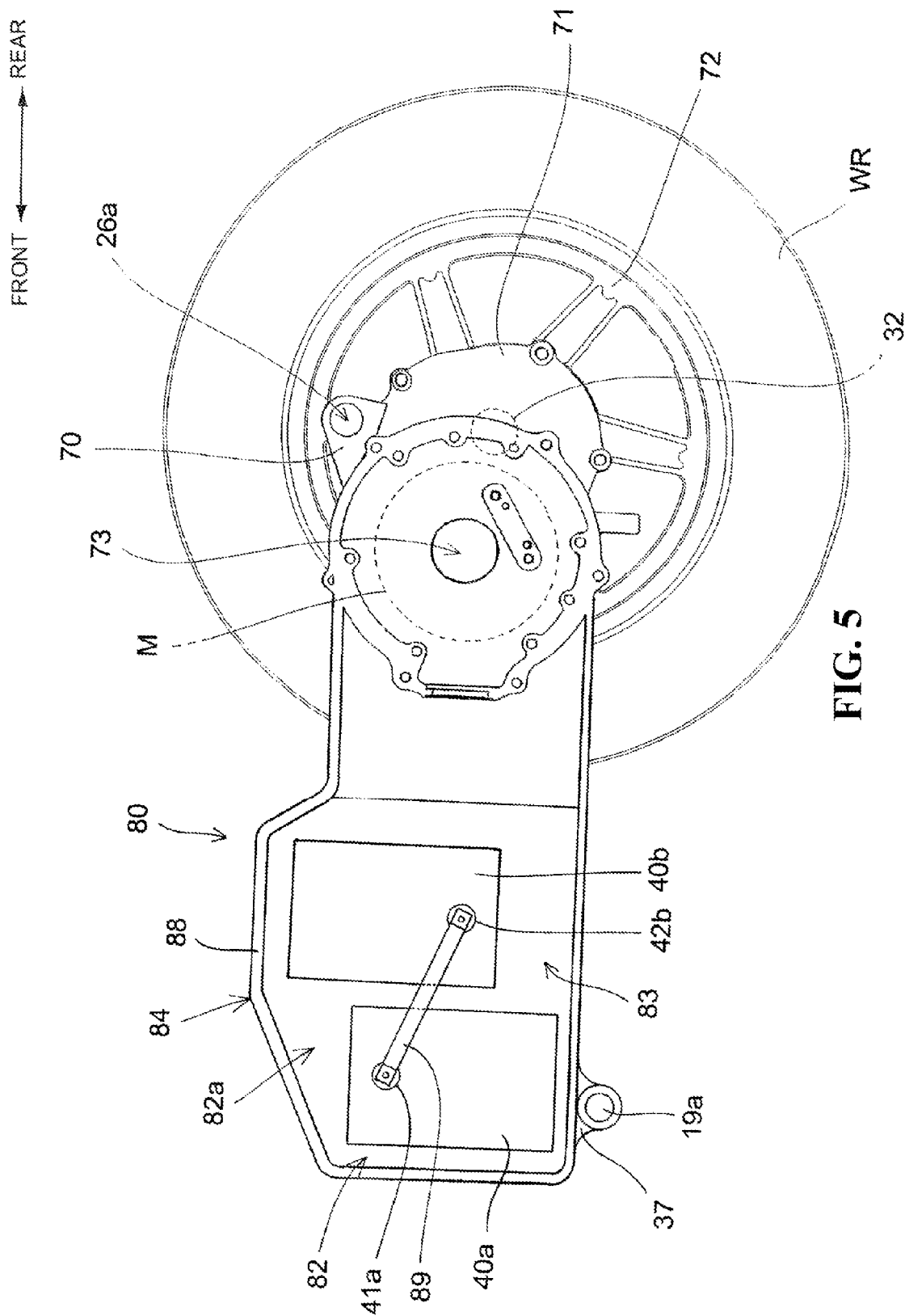
FIG. 5 is an enlarged side view of a body case according to a second embodiment.

FIG. 5 is an enlarged side view of a body case 80 of a swing arm according to a second embodiment. It is to be noted that the same reference signs as above refer to the same or similar portions. A feature of this embodiment is that the battery 40b located on the vehicle-body rear side is offset upwardly of the vehicle body with respect to the battery 40a located on the vehicle-body front side, and the body case 80 is formed based on this layout.

A protruding portion 88 that protrudes upwardly to allow for the storage of the battery 40b offset upwardly is provided at a roof portion of a wide case portion 84 forming a storage space 82. An air reservoir space 82a is therefore formed above the battery 40a located on the vehicle-body front side. The air reservoir space 82a facilitates release of the heat generated in the batteries 40a and 40b from an upper surface of the wide case portion 84, resulting in an increase in the cooling effect.

Also, the rear-side battery 40b is offset upwardly with respect to the front-side battery 40a, thereby allowing a reduction in length of a bus bar 89 connecting between the positive terminal 41a of the battery 40a and the negative terminal 42b of the battery 40b.

It should be noted that a space 83 formed below the rear-side battery 40b can be utilized as a space to put various electrical equipment, or the like. It should be also noted that, in order to minimize the dimension in the vehicle width direction of the body case 80, the batteries 40a and 40b are disposed without being offset in the vehicle width direction with respect to each other. Also, the swing arm cover (not shown) is shaped to conform to the body case 80 and designed to seal the body case 80.

Figure 6:
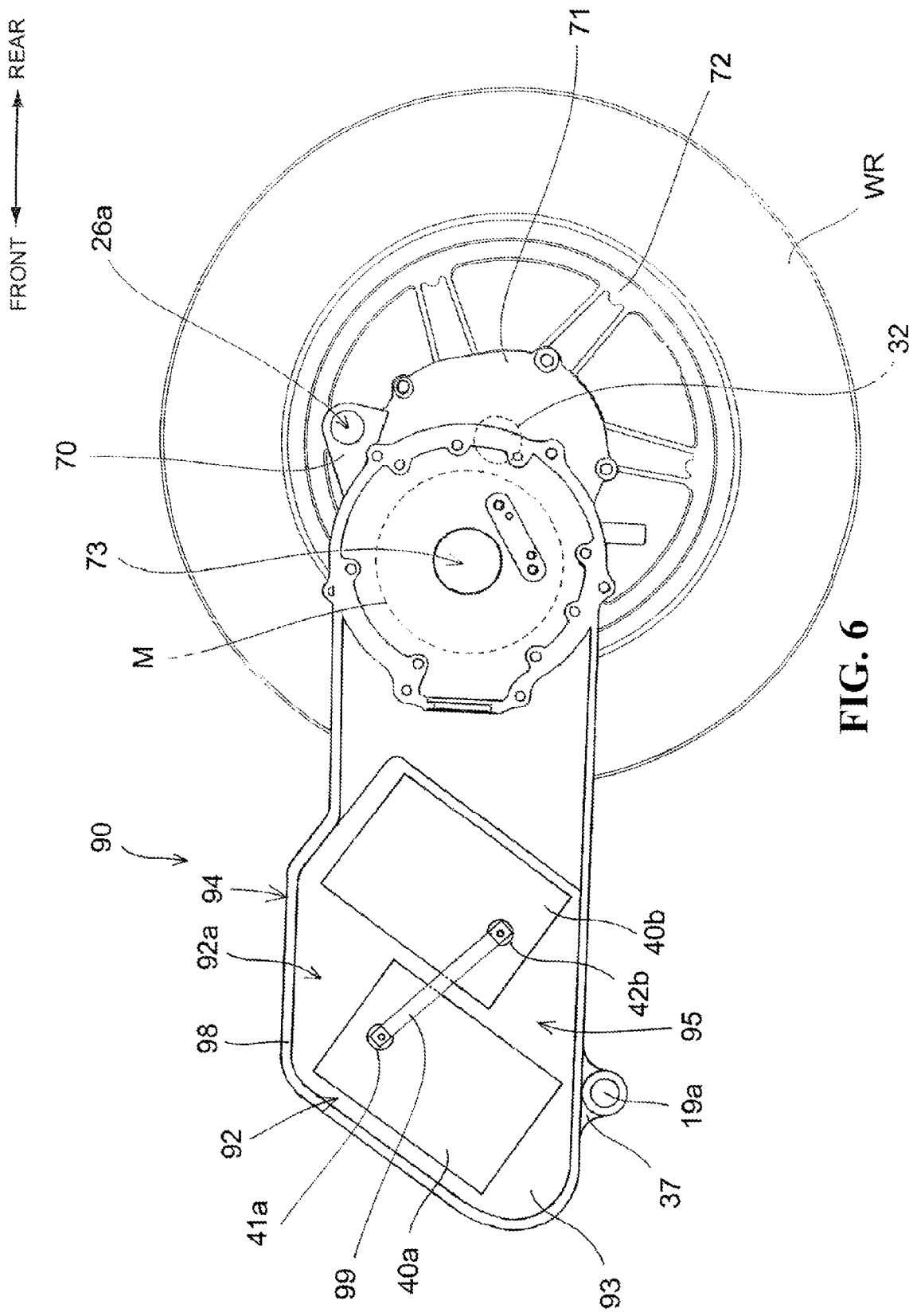
FIG. 6 is an enlarged side view of a body case according to a third embodiment.

FIG. 6 is an enlarged side view of a body case 90 of a swing arm according to a third embodiment. It is to be noted that the same reference signs as above refer to the same or similar portions. A feature of this embodiment is that the batteries 40a and 40b of a substantially rectangular parallelepiped are disposed inclined rearwardly, and the body case 90 is formed based on this layout.

A protruding portion 98 that protrudes upwardly to allow for the storage of the batteries 40a and 40b inclined rearwardly (rotated at a predetermined angle to the vehicle-body rear side) is provided at a roof portion of a wide case portion 94 forming a storage space 92. The batteries 40a and 40b are disposed in parallel to each other and in such a manner that vertical positions thereof are the same, thereby forming an air reservoir space 92a in the rear of and above the battery 40a and in front of and above the battery 40b.

The air reservoir space 92a facilitates release of the heat generated in the batteries 40a and 40b from an upper surface of the wide case portion 94, resulting in an increase in the cooling effect. Also, a front-side air reservoir space 93 is formed in front of and below the front-side battery 40a, and therefore the heat release therefrom can be also expected. It should be noted that a space 95 formed below the batteries 40a and 40b can be utilized as a space to put various electrical equipment, or the like.

Also, the batteries 40a and 40b are disposed inclined rearwardly of the vehicle body, thereby allowing a reduction in length of a bus bar 99 connecting between the positive terminal 41a of the battery 40a and the negative terminal 42b of the battery 40b. It should be noted that, also in this embodiment, the batteries 40a and 40b are disposed without being offset in the vehicle width direction with respect to each other. The swing arm cover, not shown, is shaped to conform to the body case 90 and designed to seal the body case 90.

Figure 7:
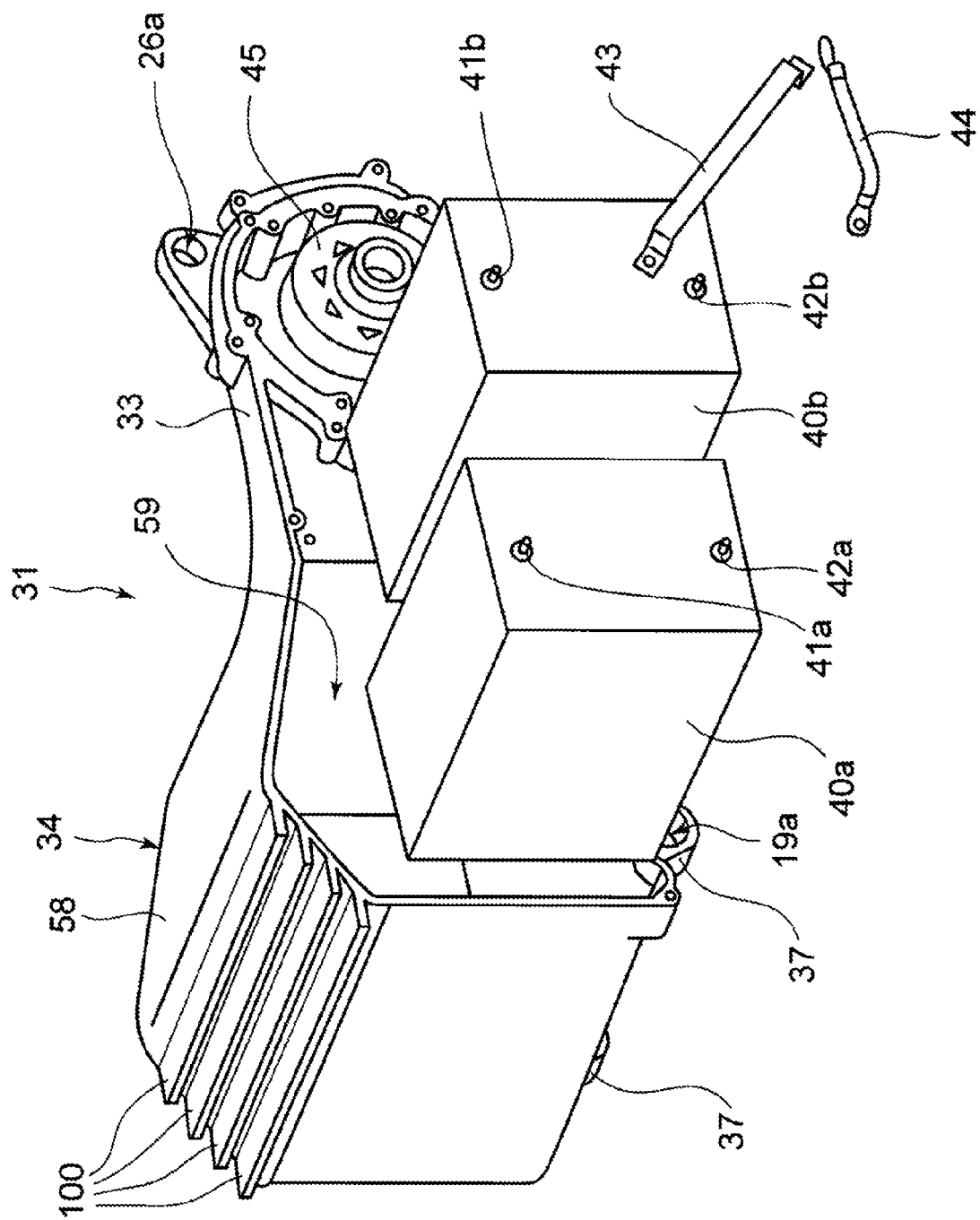
FIG. 7 is an exploded perspective view of a body case according to a modification of one embodiment.
Figure 8:
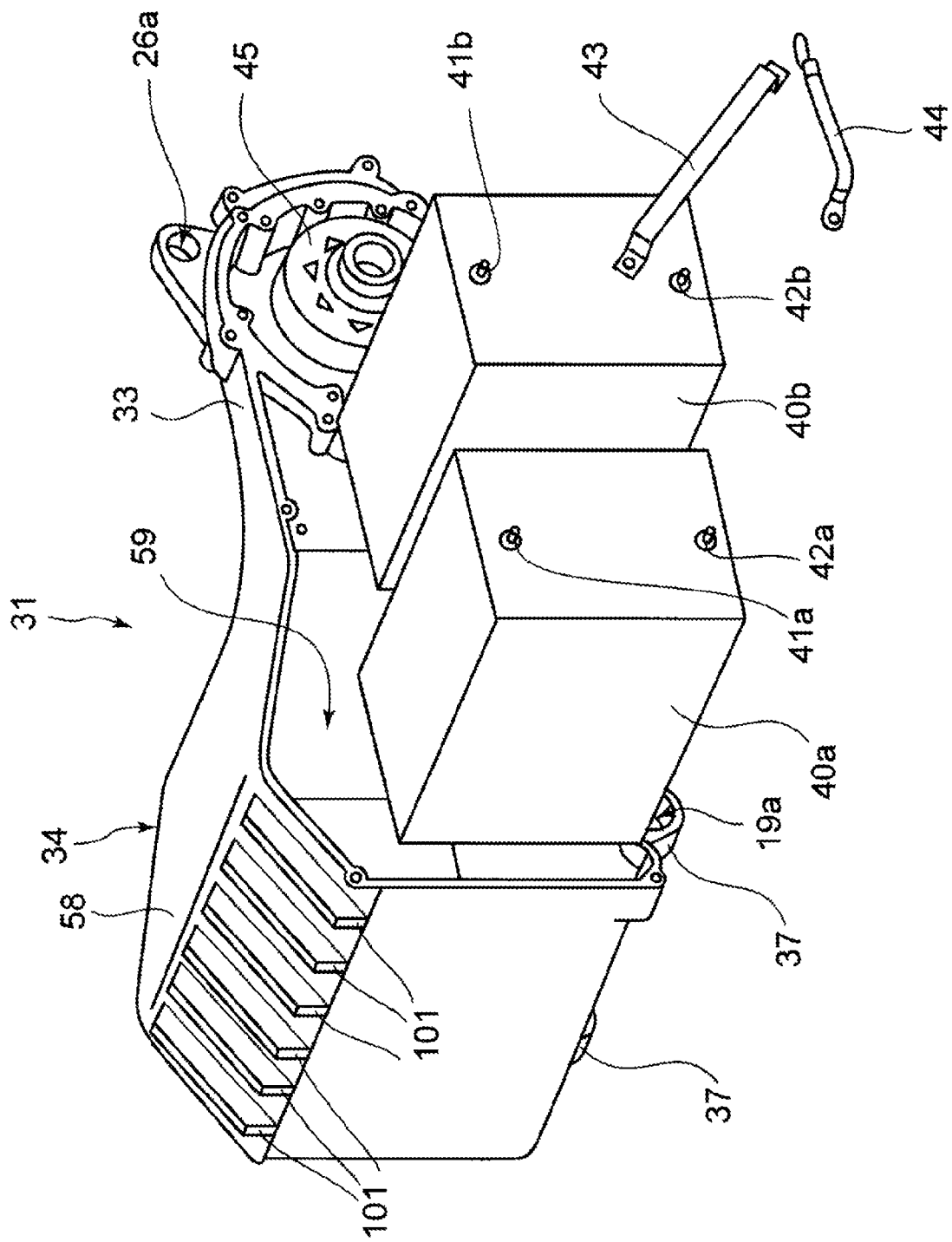
FIG. 8 is an exploded perspective view of a body case according to a second modification of one embodiment.

FIGS. 7 and 8 are respectively exploded perspective views of the body cases 31 according to a modification and a second modification of one embodiment. It is to be noted that the same reference signs as above refer to the same or similar portions. Respective features of this modification and the second modification are that cooling fins are provided on the wide case portion 34 of the body case 31.

In each of this modification and the second modification, cooling fins are formed on an inclined surface on the vehicle-body front side forming the protruding portion 58, that is, on the portion of the protruding portion 58 onto which the traveling wind positively introduced from the cooling duct 15 (see FIG. 1) blows, thereby increasing the cooling effect. Cooling fins 100 shown in FIG. 7 are directed parallel to the vehicle width direction, while cooling fins 101 shown in FIG. 8 are directed parallel to the front-rear direction of the vehicle body. The cooling fins 100 and 101 are each integrally formed with the body case 31, however, the arrangement may be such that a separate fin-like member may be mounted to the body case 31. It should be noted that these cooling fins may be formed on an inclined surface on the vehicle-body rear side of the protruding portion 58, a surface on the vehicle-body front side of the wide case portion 34, the swing arm cover, etc.

As described above, in the electric vehicle, the protruding portion for providing the air reservoir space above the batteries is provided at the roof portion of the wide case portion that is formed on the swing arm for storing the batteries. Thus, the air heated by the batteries rises up into the air reservoir space to be easily released from the surface of the protruding portion. Consequently, the cooling effect of the batteries is increased only by varying the shape of the wide case portion. Also, even in a case where the plural batteries are disposed close to one another within the wide case, an electric fan or the like for cooling becomes unnecessary, so that an increase in complexity of the swing arm structure can be avoided.

It should be understood that the structure of the electric vehicle, the shape and structure of the swing arm, the shapes and structures of the wide case portion and the protruding portion provided on the swing arm, the shape and structure of the batteries, the layout positions of the batteries, the shape and layout of the cooling duct, etc., are not limited to the above-described embodiments, and various changes may be made. For example, a partition plate may be provided between the batteries. The swing arm structure is not limited to the electric motorcycle, but also is applicable to various types of vehicles such as saddle-ride type three-wheeled or four-wheeled vehicles having the swing arm.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. An electric vehicle, comprising:
a vehicle body;
a drive wheel;
an electric motor for driving said drive wheel;
at least two batteries having a substantially rectangular parallelepiped shape; and
a swing arm swingably mounted to said vehicle body by a pivot shaft, said swing arm comprising a wide case portion disposed directly in front of an arm portion, in a front-rear direction of the vehicle body, said wide case portion being wider than said arm portion, in a vehicle width direction,
wherein said wide case portion houses said at least two batteries,
wherein said arm portion houses said electric motor, and
wherein said swing arm includes a protruding portion forming an air reservoir space above said at least two batteries, said protruding portion being a roof portion of said wide case portion,
wherein said electric vehicle further comprises a cooling duct for causing traveling wind introduced from a front of said vehicle body to blow onto said protruding portion, and
wherein said cooling duct includes an exhaust port disposed forward of said protruding portion, such that a space is present between said exhaust port and said protruding portion.

2. The electric vehicle according to claim 1,
wherein said at least two batteries are disposed in a line in the front-rear direction of said vehicle body; and
wherein, in a side view of said vehicle body, the protruding portion is substantially convex and protrudes upward from said at least two batteries.

3. The electric vehicle according to claim 2, wherein a surface of said protruding portion includes heat releasing fins.

4. The electric vehicle according to claim 3, wherein said swing arm further comprises a substrate having a drive circuit of said electric motor and a charging circuit for said at least two batteries.

5. The electric vehicle according to claim 2, wherein said swing arm further comprises a substrate having a drive circuit of said electric motor and a charging circuit for said at least two batteries.

6. The electric vehicle according to claim 1,
wherein said at least two batteries are disposed in a line in the front-rear direction of said vehicle body;
wherein, in a side view of the vehicle body, said at least two batteries are disposed parallel to each other and are inclined rearwardly, relative to a lower wall of the swing arm; and
wherein said air reservoir space is provided above said at least two batteries.

7. The electric vehicle according to claim 6, wherein said at least two batteries are inclined such that vertical positions of said at least two batteries are equal.

8. The electric vehicle according to claim 6, wherein said swing arm further comprises a substrate having a drive circuit of said electric motor and a charging circuit for said at least two batteries.

9. The electric vehicle according to claim 1, wherein a surface of said protruding portion includes heat releasing fins.

10. The electric vehicle according to claim 9, wherein said swing arm further comprises a substrate having a drive circuit of said electric motor and a charging circuit for said at least two batteries.

11. The electric vehicle according to claim 1,
wherein said at least two batteries are disposed in a line in the front-rear direction of said vehicle body;
wherein, in a side view of the vehicle body, a rear battery among said at least two batteries is offset upwardly with respect to a front battery among said at least two batteries; and
wherein said air reservoir space is provided above said front battery.

12. The electric vehicle according to claim 11, wherein said swing arm further comprises a substrate having a drive circuit of said electric motor and a charging circuit for said at least two batteries.

13. The electric vehicle according to claim 1, further comprising a partition plate at least partially enclosing said at least two batteries in said wide case portion.

14. The electric vehicle according to claim 1, wherein at least a portion of said wide case portion is disposed above said pivot shaft.

15. The electric vehicle according to claim 1, wherein said swing arm further comprises a substrate having a drive circuit of said electric motor and a charging circuit for said at least two batteries.

16. The electric vehicle according to claim 1, wherein said swing arm is disposed only on one side of said drive wheel.

* * * * *